April 12, 1960 C. P. GALAS 2,932,246
MEAT PRESS
Filed July 2, 1956 4 Sheets-Sheet 1

INVENTOR:
Charles P. Galas,
BY
Pair Freeman & Molinare
ATTORNEYS.

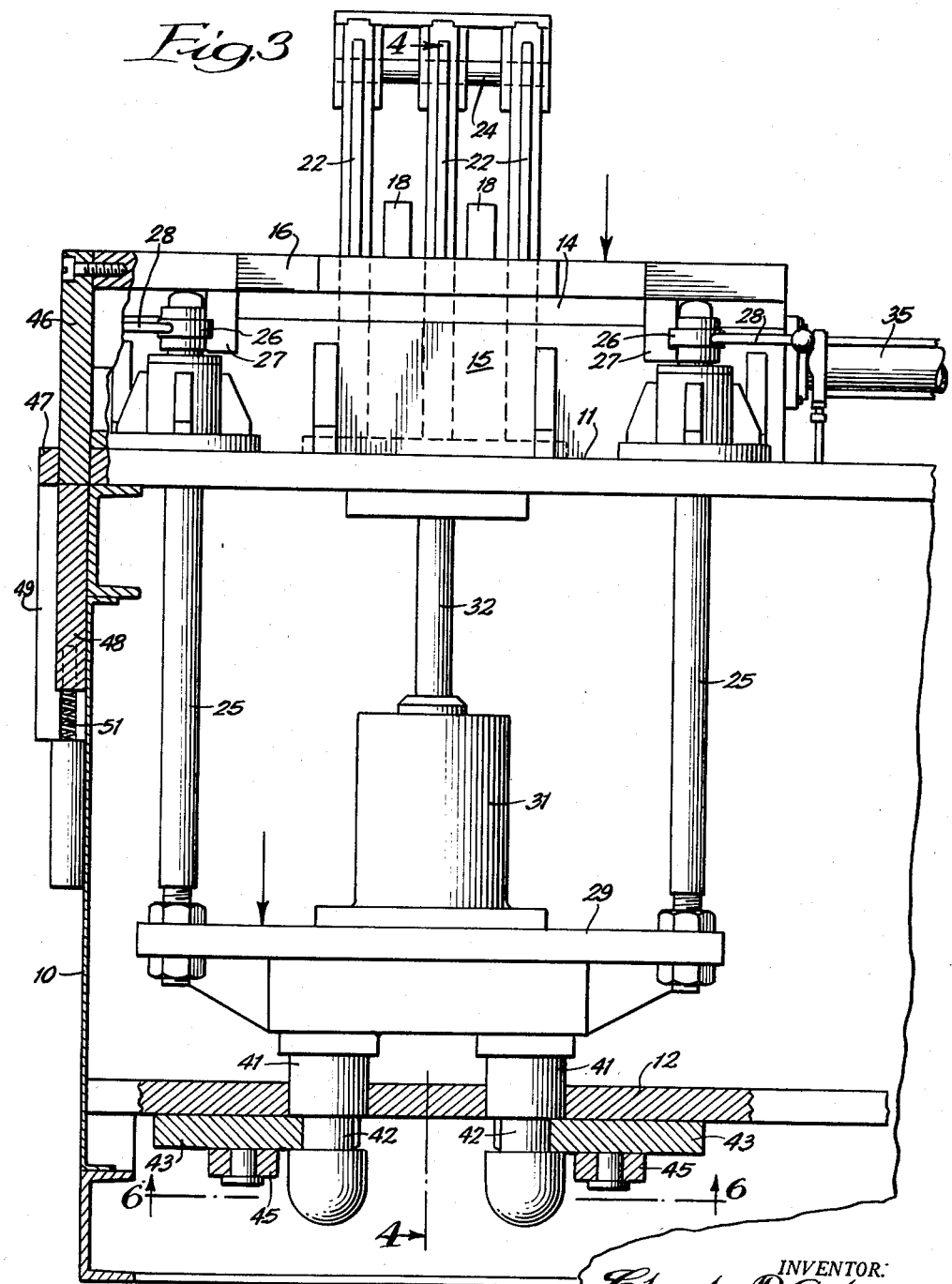

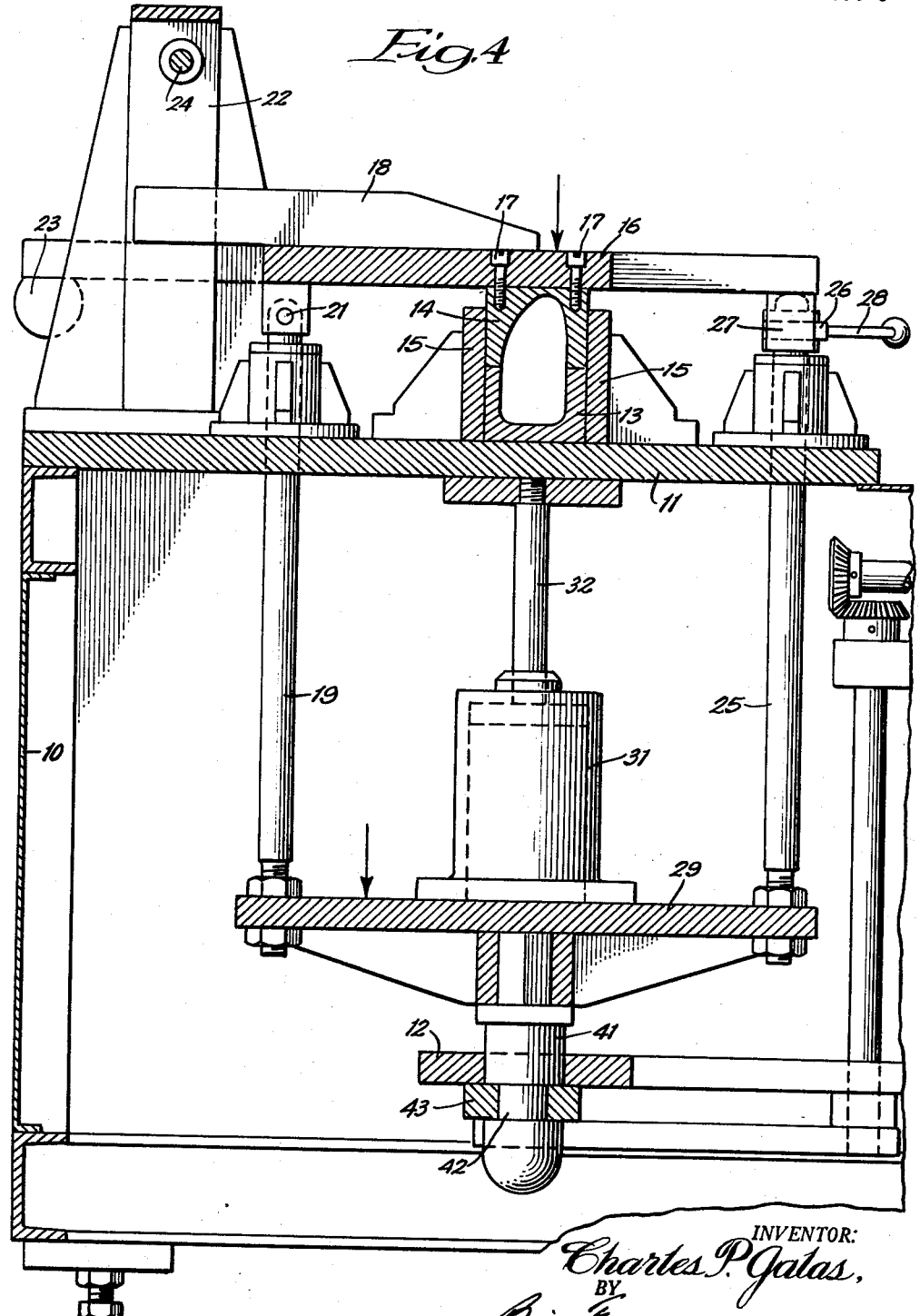

April 12, 1960
C. P. GALAS
2,932,246
MEAT PRESS
Filed July 2, 1956
4 Sheets-Sheet 4
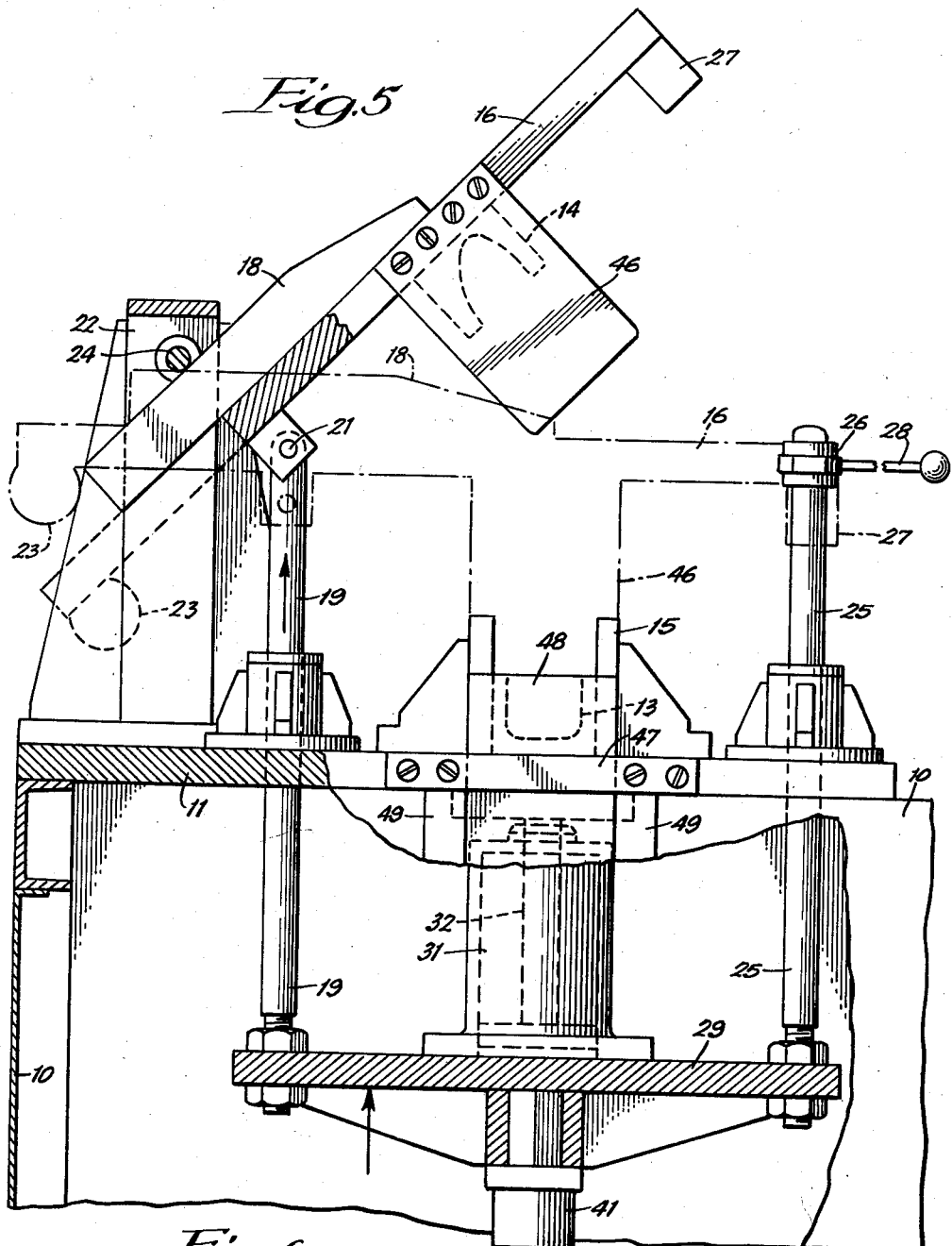
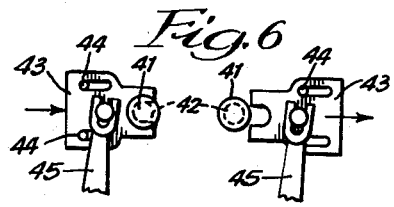
INVENTOR:
Charles P. Galas,
BY
Bair, Freeman & Molinare
ATTORNEYS.

United States Patent Office 2,932,246
Patented Apr. 12, 1960

2,932,246
MEAT PRESS

Charles P. Galas, Chicago, Ill.

Application July 2, 1956, Serial No. 595,361

8 Claims. (Cl. 100—232)

This invention relates to meat presses and more particularly to a press for forming ground, chopped, or solid pieces of meat to uniform section for slicing.

For making various types of solid meat products, such as steaks, chops, ground and chipped meat patties, and the like, it is desirable to produce an elongated strip of meat of uniform section and uniform density which can be sliced to the desired thickness to provide a plurality of slices of identical shape and weight. It has heretofore been proposed to accomplish this purpose by subjecting the meat while frozen, or partially frozen, to pressure in a mold or die to produce an elongated strip of meat for slicing. It is one of the objects of the present invention to provide a meat press which will accomplish this purpose rapidly and efficiently.

Another object is to provide a meat press in which there are top and bottom dies separable for filling with the top die being movable linearly to and from the bottom die and being pivotally swung away from the bottom die in its elevated position to facilitate filling the bottom die with meat products.

Another object is to provide a meat press in which the top die is moved toward and away from the bottom die by a hydraulic motor and mechanical latch means are provided to hold the top die securely in contact with the bottom die to withstand the mold pressure.

According to one feature of the invention, the top die is mounted on a support which is pivoted to vertically reciprocable mounting means at one side of the dies and which is detachably latched to the support at the other side of the dies. When the latch means is engaged, the top die will move linearly toward and away from the bottom die and when the latch means is disengaged the support and top die can pivot away from the bottom die to be out of the way during filling.

A further object is to provide a meat press in which the top die is automatically pivoted away from the bottom die when the top die and the support are raised.

A still further object is to provide a meat press in which a closure for one end of the die cavity is carried by the support for the top die and moves into registry with the end of the bottom die to close both die cavities at one end when the top die is moved downward.

According to one feature of the invention a temporary closure is provided for the end of the bottom die to facilitate filling and moving away by the top closure plate when the support moves down to molding position.

The above and other objects and advantages of my invention will be more readily apparent from the following description, when read in connection with the accompanying drawings, in which:

Figure 3 is a front view of the meat press with parts broken away and with parts in section;

Figure 4 is a transverse section on the line 4—4 of Figure 3;

Figure 5 is an end view similar to Figure 4 with parts in elevation showing the top die in raised position; and Figure 6 is a partial plan view of the mechanical latch means.

Figure 1:
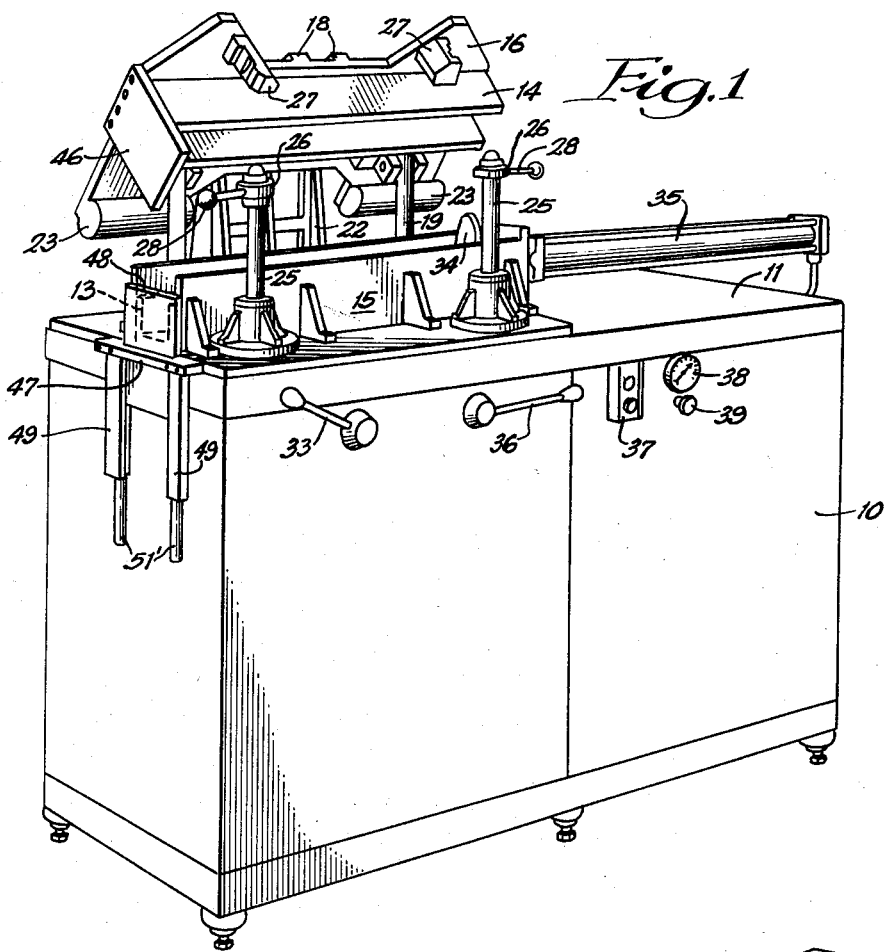
Figure 1 is a perspective view of a meat press embodying the invention showing the top die and its support in elevated position.

The complete press of the present invention, as shown in Figure 1, comprises a cabinet 10 within which the motivating and power means for operating the various press parts may be contained and which serves as a support for the several parts of the press. As best seen in Figures 3 and 4, the cabinet has a top supporting plate 11 for supporting the bottom die and which may be a relatively heavy plate to take the strains imposed thereupon during operation of the press. A transverse plate 12 is mounted in the cabinet near, but spaced above the bottom thereof and is provided with openings therethrough to cooperate with mechanical latching means, as described hereinafter.

Figure 2:
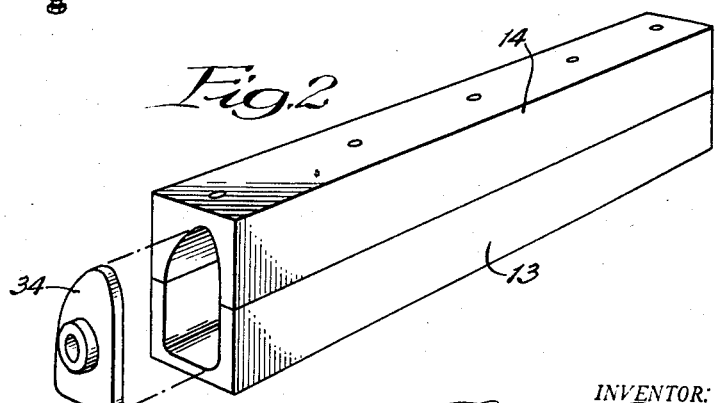
Figure 2 is a perspective view of a top and bottom die set and of a plunger for cooperation therewith.

The meat products to be molded are shaped in a die set including an elongated bottom die 13 and a complementary top die 14 each having a cavity of uniform section running the full length thereof with cavities in the die halves cooperating, as shown in Figures 2 and 4, to define an elongated open ended cavity of the cross section to which it is desired to form the meat. As illustrated, the cavity is in approximately the form of a conventional steak, although it could obviously be made round, generally rectangular or of any other desired configuration. The bottom die 13 is mounted on the cabinet top plate 11 between supporting members 15 which are permanently attached to the top plate 11 so that the die will be accurately positioned and firmly held. The supporting members 15 comprise plates extending vertically above the top of bottom die 13 to serve as guides for the top die and to prevent spillage of material over the sides of the bottom die.

The top die is detachably secured to a supporting plate 16 as by means of screws 17, or the like, to be accurately aligned with the bottom die. The supporting plate 16 may be reinforced by ribs 18 and is adapted to be moved toward and away from the top plate 11 of the cabinet to open the die cavities for filling and to close the die cavities for a pressing operation.

For this purpose, the supporting plate is secured to mounting means shown as comprising a pair of spaced rods 19 extending vertically through the top plate at one side of the bottom die and pivotally connected at their upper ends to the supporting plate, as shown at 21. At its rear end portion beyond the rods 19 the supporting plate is slotted to receive fixed vertical frame members 22 and projects beyond the frame members to terminate in a counterweight 23. The frame members 22 are connected at their upper ends by a cross rod 24 which extends between the adjacent frame members 22 to engage the upper part of the supporting plate or the reinforcements 18 therefor when the mounting means 19 are raised to tilt the plate and the top die, as shown in Figure 5.

At the opposite side of the dies, the mounting means includes an additional pair of vertical rods 25 extending slidably through the top plate 11 of the cabinet and carrying latching means for detachable connection to the front edge of the supporting plate. The latching means may be formed in any desired manner, but, as shown, comprises rotatable collars 26 carried by the upper ends of the rods 25 and formed with flats in one side thereof. The collars cooperate with lugs 27 projecting downward from the supporting plate and having grooves therein to receive the collars. The collars may be turned by means of handles 28 to bring the flats on the collars into registry with the lugs 27 when it is desired to release the latches or to move the uninterrupted portions of the collars into the grooves in the lugs to connect the supporting plate to the mounting rods 25.

The several mounting rods 19 and 25 are carried and moved in unison by a plate 29 mounted within the housing and moved vertically therein by a fluid motor shown as comprising a cylinder 31 secured to the plate 29 and having a piston therein whose piston rod 32 bears against the lower surface of the top plate 11. When fluid is admitted to the upper end of the cylinder 31 the plate 29 will be raised simultaneously to raise the mounting rods 19 and 25 to open the dies, as shown in Figures 1 and 5, and when fluid is admitted to the lower end of the cylinder 31 the plate will be lowered to the position shown in Figures 3 and 4 to close the dies for a pressing operation. The motor may be controlled by a control handle 33 accessible at the front of the housing for easy control and operation of the dies.

Material in the dies is compressed by a plunger, as shown at 34, shaped to fit slidably within the closed die cavity and mounted on the piston rod of a fluid motor 35 carried by the top of the housing. The fluid motor 35 is connected to a source within the housing which may conveniently be a pump and reservoir which also supplies the cylinder 31. When fluid is admitted to the outer end of the motor 35, the plunger 34 will be advanced in the die cavity to compress material therein and when fluid is admitted to the end of the motor 35 closest to the dies the plunger will be retracted ready for another loading operation. Supply of fluid to the motor 35 may be controlled by a handle 36 readily accessible from the front of the housing.

The fluid source within the housing, not shown in detail, may comprise an electric motor controlled by a switch 37 at the front of the housing and the pressure exerted on the meat products during a pressing operation may be controlled by a pressure regulator acting on the fluid outlet side of the pressure source. The pressure may be indicated at a gauge 38 on the front of the housing and the regulator may be adjusted by a suitable knob 39 so that the desired pressure for each different type of product may be accurately controlled and uniformity of product may be obtained.

To insure that the top and bottom dies will not separate under the pressure developed during a pressing operation and regardless of the pressure acting on the cylinder 31 mechanical latch means are provided to hold the dies in closed position. As shown, such latch means comprise a pair of extending rods 41 secured to the bottom of the plate 29 to project through openings in the plate 12 within the housing when the dies are in closed position. The rods 41 are formed with grooves 42 therein to receive latching forks 43 which are slidable beneath the plate 12 and are supported for sliding thereof by pins 44 fitting in slots in the latch plates 43 and having enlarged heads to hold the latch plates against vertical displacement. The latch plates may be controlled through any desired type of control mechanism, such as the levers 45 illustrated in Figure 6, which engage pins carried by the latch plates. The levers may be operated manually through any desired type of manual control, but are preferably operated by fluid motors, not shown, which are energized through the control handle 33 to engage the latches after the dies have been moved together with the plate 29 at its maximum lowered position. At this time, the dies are in contact with each other ready for a molding operation and the mechanical latch mechanism will hold the dies securely closed regardless of the fluid pressure present so that no product can escape at the sides of the dies during a pressing operation.

To close the outer end of the die cavity during pressing, a closure plate 46 is provided rigidly secured to the top supporting plate 16 and overlying the adjacent end of the top die 14. It will be seen that by attaching the closure plate to the supporting plate it need not be removed during exchange of dies and can form in effect a permanent part of the assembled machine. When the top die moves down to molding position in engagement with the bottom die, the closure plate 46 will move over the end of the bottom die to close the complete die cavity so that no material can escape therefrom during the molding operation. The closure plate is braced by a cross piece 47, as shown in Figures 1 and 3, which receives the lower edge of the closure plate 46 when it is in its lowered position to hold it securely in contact with the adjacent end of the bottom die.

To close the bottom die temporarily during filling a second slidable closure plate 48 is provided slidable vertically in guides 49 at the end of the housing and urged upwardly by springs 51 housed in tubes 51'. When the upper die is raised the temporary closure plate 48 will rise to the position shown in Figure 1 to close the outer end of the bottom die. Thus during filling of the bottom die with, for example, loose material spillage is eliminated. When the top die moves downward to molding position the closure plate 46 will engage the upper end of the temporary closure plate 48 and press it downward to the position shown in Figure 3 so that the closure plate 46 is effective to securely close the outer end of the die cavity.

In operation, assuming that the motor is running to provide fluid under pressure the handle 33 may be operated to its upper position, as shown, to raise the plate 29 thereby to raise the supporting plate 16 and the top die 14, as shown in Figures 1 and 5. The latch handles 28 are turned at this time to release the latches so that when the supporting plate 16 reaches the elevation of the cross rod 29 the supporting plate and top die will be tilted away from the bottom die to the position shown in Figures 1 and 5 so that easy access can be had to the bottom die for filling it.

It will be understood that the bottom die may be filled with any desired meat material which is to be pressed either in the form of small chunks of meat, ground meat, or solid boneless pieces of meat which are to be formed into slabs of uniform cross section. Preferably the meat is frozen when it is processed since it is found that pressing the meat in frozen condition has a tenderizing effect on it and since the meat will hold its shape better after the pressure is relieved. If desired, however, fresh unfrozen meat can be treated.

After the meat to be treated is placed in the bottom die the handle 33 is reversed to move the top die downward. During the initial movement, the top die will swing about the pivot 21 to a horizontal position, as shown in dot-dash lines in Figure 5, in which position the latch lugs 27 will register with the latch collars 26 on the mounting posts 25. At this time, the latch handles 28 are turned to engage the latch handle and the handle 33 is again operated to move the mounting means downward. During this final movement, the mounting plate and upper die move linearly toward the lower die until the upper die is pressed tightly against the lower die to provide a closed die cavity. During this movement, the closure plate 46 will move the temporary closure plate 48 out of the way and the latches 43 will be engaged to hold the top supporting plate and top die securely in closed position. The handle 36 may then be operated to advance the plunger 34 into the die cavity to press the meat material therein. As noted above, the pressure exerted may be adjusted through the regulator knob 39 so that the correct degree of pressure for any particular product may be obtained very accurately and with a high degree of consistency throughout a plurality of operations. This is important since it will insure that each pressed product is of the same density and since its cross section is uniform, slices of a given thickness will have the same weight so that the necessity for weighing the different slices is eliminated.

Upon completion of the pressing operation the handle 33 may again be raised to elevate the mounting means and to open the dies. The pressed material may be lifted out or may if desired be pushed from the end of the bottom die by lowering the temporary closure plate 48 and the press is then in condition for reloading and a subsequent pressing operation.

While one embodiment of the invention has been shown and described herein, it will be understood that it is illustrative only and not to be taken as a definition of the scope of the invention, reference being had for this purpose to the appended claims.

What is claimed is:

1. A meat press comprising an elongated bottom die having an open topped cavity therein, an elongated top die to fit over the bottom die and to form therewith an elongated cavity of closed section, means to close one end of the cavity, a plunger movable in the cavity to compress meat therein, means to move the plunger lengthwise of the cavity, reciprocable mounting means for the top die, means to reciprocate the mounting means linearly toward and away from the bottom die, the top die being pivotally connected to the mounting means at one side of the cavity, and a part fixed relative to the bottom die engageable with the top die at a point spaced on the side of its pivotal axis remote from the cavity when the mounting means is moved away from the bottom die to tilt the top die about its pivotal connection to the mounting means away from the bottom die.

2. A meat press comprising an elongated bottom die having an open topped cavity therein, an elongated top die to fit over the bottom die and to form therewith an elongated cavity of closed section, means to close one end of the cavity, a plunger movable in the cavity to compress meat therein, means to move the plunger lengthwise of the cavity, reciprocable mounting means for the top die including parts on opposite sides of the bottom die, a support for the top die pivotally mounted on the parts on one side of the bottom die, releasable latch means to connect the support to the parts on the other side of the bottom die, and means to reciprocate the parts simultaneously toward and away from the bottom die.

3. A meat press comprising an elongated bottom die having an open topped cavity therein, an elongated top die to fit over the bottom die and to form therewith an elongated cavity of closed section, means to close one end of the cavity, a plunger movable in the cavity to compress meat therein, means to move the plunger lengthwise of the cavity, reciprocable mounting means for the top die including parts on opposite sides of the bottom die, a support for the top die pivotally mounted on the parts on one side of the bottom die, releasable latch means to connect the support to the parts on the other side of the bottom die, a fluid motor to move the parts simultaneously toward and away from the bottom die, and a mechanical latch to latch the parts in a position adjacent to the bottom die with the top and bottom dies in contact.

4. A meat press comprising a bottom die having an elongated open topped cavity therein open at both ends, a top die to fit over the bottom die and having an elongated open bottomed cavity therein complementary to the cavity in the bottom die to form therewith an elongated cavity of closed section open at its ends, a plunger slidable in one end of the cavity and of a shape to fit slidably therein, a support for the top die, means detachably mounting the top die on the support, mounting means for the support, means to move the mounting means vertically to move the top die away from and into contact with the bottom die, a closure plate for the other end of the cavity rigidly carried by the support in registry with the end of the top die to move over the end of the bottom die to close the same when the mounting means moves down to move the top die into contact with the bottom die and a part fixed relative to the bottom die and engaging the lower edge of the plate to hold it against movement away from the end of the bottom die when the mounting means moves down.

5. A meat press comprising a housing, a bottom die mounted on top of the housing and having an elongated open topped cavity therein open at both ends, a top die to fit over the bottom die and having an elongated open bottomed cavity therein complementary to the cavity in the bottom die to form therewith an elongated cavity of closed section open at its ends, a plunger slidable in one end of the cavity and of a shape to fit slidably therein, a plate slidably mounted on the end of the housing in registry with the other end of the bottom die, spring means yieldably urging the plate upward to close said other end of the bottom die, means mounting the top die for vertical movement toward and away from the bottom die, and a closure plate carried by the last named means in registry with the other end of the top die, the closure plate engaging the top of the first named plate to move it downward against the spring means as the top die is moved downward.

6. A meat press comprising a housing, a bottom die mounted on top of the housing and having an elongated open topped cavity therein open at both ends, a top die to fit over the bottom die and having an elongated open bottomed cavity therein complementary to the cavity in the bottom die to form therewith an elongated cavity of closed section open at its ends, a plunger slidable in one end of the cavity and of a shape to fit slidably therein, a support for the top die, mounting members for the support slidable vertically on opposite sides of the bottom die, the support being pivoted on an axis parallel to the length of the cavity on the upper ends of the mounting members on one side of the bottom die, latch means to connect the support to the mounting members on the other side of the bottom die, means acting on the support when it is raised to tilt it about said axis away from the bottom die, and means to raise and lower the mounting members simultaneously.

7. The construction of claim 6 in which said means acting on the support comprises a fixed stop positioned above the support on the side of the pivotal axis remote from the top die.

8. A meat press comprising a housing, a bottom die mounted on top of the housing and having an elongated open topped cavity therein open at both ends, a top die to fit over the bottom die and having an elongated open bottomed cavity therein complementary to the cavity in the bottom die to form therewith an elongated cavity of closed section open at its ends, a plunger slidable in one end of the cavity and of a shape to fit slidably therein, a support for the top die, mounting members for the support slidable vertically on opposite sides of the bottom die, the support being pivoted on an axis parallel to the length of the cavity on the upper ends of the mounting members on one side of the bottom die, latch means to connect the support to the mounting members on the other side of the bottom die, means acting on the support when it is raised to tilt it about said axis away from the bottom die, a fluid motor in the housing connected to the mounting member simultaneously to raise and lower them, and mechanical latch means in the housing to latch the mounting members in lowered position with the dies in engagement.

References Cited in the file of this patent

UNITED STATES PATENTS

| | | |
|---|---|---|
| 561,091 | Clapp | June 2, 1896 |
| 1,624,808 | Scholten | Apr. 12, 1927 |
| 2,072,694 | Walter | Mar. 2, 1937 |
| 2,475,693 | Borzym | July 12, 1949 |
| 2,565,245 | Lebovitz | Aug. 21, 1951 |
| 2,597,592 | Minder | May 20, 1952 |
| 2,762,296 | Dunnegan | Sept. 11, 1956 |